July 15, 1941. R. B. CARSON Re. 21,854

TRANSFORMER TAP CHANGING CIRCUIT

Original Filed Feb. 11, 1939

Inventor:
Ralph B. Carson,
by Harry E. Dunham
His Attorney.

Reissued July 15, 1941

Re. 21,854

UNITED STATES PATENT OFFICE 21,854

TRANSFORMER TAP CHANGING CIRCUIT

Ralph B. Carson, Toronto, Ontario, Canada, assignor to General Electric Company, a corporation of New York Original No. 2,188,173, dated January 23, 1940, Serial No. 255,952, February 11, 1939. Application for reissue April 22, 1941, Serial No. 389,820

4 Claims. (Cl. 171—119)

This invention relates to transformer tap changing circuits and more particularly to improvements in circuits of this type which employ a mid-tapped reactor or preventive autotransformer.

One reason for changing transformer taps is to regulate or adjust the voltage ratio of the transformer. It is desirable to perform the tap changing operation without interrupting the circuit and one of the standard ways of doing this utilizes a mid-tapped reactor or preventive autotransformer. Normally the load current divides equally between the two halves of the reactor but during a tap changing operation the ends of the reactor are connected to adjacent transformer taps, in which position the voltage will correspond to a voltage midway between the bridged taps, and the circulating or short circuit current will be limited by the reactance of the reactor.

In accordance with this invention, the size and cost of the reactor are materially reduced by utilizing a pair of additional windings on the transformer connected in such a manner as to reduce the voltage across the reactor to one-half the voltage between adjacent taps. In this manner the kva. rating of the reactor need only be one-half the kva. rating of a standard reactor. Furthermore, the voltage across the reactor will be the same when the reactor is in its bridging position as when it is in its normal position (with its two ends connected to one tap), thus giving the same reactive load on the circuit and eliminating any tendency for unequal voltage steps. In addition, the voltage which the tap changing switch is required to rupture is reduced by one-half.

An object of the invention is to provide a new and improved transformer tap changing circuit.

Another object of the invention is to reduce the size and cost of the midtapped reactor used with transformed tap changing systems.

Another object of the invention is to provide a transformer tap changing system in which the reactive load on the circuit is the same for different positions of the tap changing arrangement.

Other and further objects of the invention will be apparent to those skilled in the art as the description of the invention proceeds.

The invention will be better understood by reference to the following description taken in connection with the accompanying drawing and its scope will be pointed out in the appended claims.

Figure 1:
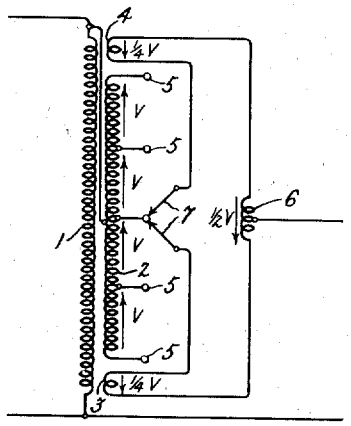
Figure 2:
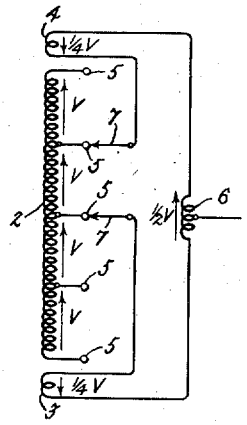

In the drawing, Fig. 1 is a diagrammatic illustration of an embodiment of my invention applied, by way of example, to a bucking and boosting autotransformer, and Fig. 2 illustrates the secondary circuit of Fig. 1 when the mid-tapped reactor is connected in its bridging position.

Referring now to the drawing, the autotransformer is provided with an exciting winding 1 and three additional windings 2, 3 and 4. Winding 2 is provided with a plurality of taps 5 which are equally spaced electrically, so that the voltage and turns between each adjacent pair of taps is the same. A mid-tapped reactor 6 is arranged to have its ends connected to the same or different ones of the taps 5 by any suitable switching mechanism 7. Winding 3 is connected in series with one end of the reactor and winding 4 is connected in series with the other end of the reactor. The windings 3 and 4 each have one-fourth as many turns as there are between adjacent taps on the winding 2 so that the voltage of the windings 3 and 4 is one-fourth the voltage between taps 5. The polarities of the windings 3 and 4 are additive in the series circuit through the reactor 6 and the switching means 7 and are subtractive with respect to the voltage between taps 5. Consequently, the voltage across the reactor 6 is one-half the voltage between adjacent taps 5. However, the voltage of the midpoint of the reactor 6 will be the same as the voltage of the tap 5 to which the switching means 7 is connected.

If now it is desired to change the transformer voltage ratio, the switching mechanism 7 is first moved to the bridging position shown in Fig. 2. In this position the voltage across the reactor 6 will be the same magnitude as in Fig. 1, namely one-half the voltage between adjacent taps. However, instead of being produced by the sum of the voltages of the windings 3 and 4, it is produced by the difference between the voltage between the bridged taps and the sum of the voltages of the windings 3 and 4. This causes a reversal of its polarity or phase. The voltage of the mid-point of the winding 6 will be the same as the voltage midway between the bridged taps.

The tap changing operation is completed by moving the lowermost element of the double finger switching means 7 to the second tap from the top so as to produce a circuit connection corresponding to that shown in Fig. 1, except that both fingers of the switching mechanism are connected to the second tap from the top instead of to the middle tap.

It is to be noted that when the sum of the voltages of the windings 3 and 4 is equal to one-half the tap voltage, the voltage rating of the reactor 6 will be a minimum because raising the voltage of the windings 3 and 4 will increase the voltage of the reactor for the switching position shown in Fig. 1, while lowering the voltage of the windings 3 and 4 will increase the voltage of the reactor for the bridging position shown in Fig. 2. Furthermore, by making the voltages of the windings 3 and 4 equal, the voltage of the midpoint of the reactor 6 will always correspond exactly to the voltage of the tap to which the switching mechanism is connected in the position shown in Fig. 1 and will always correspond exactly to the voltage half way between taps for the bridging position shown in Fig. 2.

As the same voltage exists across the reactor for the positions shown in both Figs. 1 and 2, the same circulating current will flow through the reactor under these conditions and consequently the reactive load on the circuit will be the same, thus eliminating any tendency for unequal voltage steps.

Another advantage of the invention is that the voltage of the circuit which the switching means 7 is required to open is never more than one-half the tap voltage, whereas in ordinary circuits it is the full tap voltage.

Switching mechanism 7 may be of any one of the several well-known types and it may either be manually operated or automatically operated in the conventional manner.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of my invention.

What I claim as new and desire to secure by Letters Patent of the United States is:

1. In combination, a transformer provided with a winding having a plurality of spaced taps between any electrically adjacent pair of which there is the same potential difference, a mid-tapped reactor, switching means for selectively connecting the ends of said reactor to the same or different ones of said taps, and means for inserting between each end of said reactor and said switching means separate potentials equal respectively to one-quarter of the potential between said taps, the relative polarities of said separate potentials being such that the potential of said reactor is one-half the potential between said taps regardless of whether said switching means connects the ends of said reactor to the same or to adjacent taps.

2. In combination, a transformer provided with an exciting winding and three additional windings having voltages induced therein by said exciting winding, one of said additional windings being provided with a plurality of taps between electrically adjacent ones of which there are the same number of turns, a mid-tapped reactor, and switching means for connecting the ends of said reactor to the same or different ones of said taps, each of the remaining two additional windings being connected between a different end of said reactor and said switching means, said last-mentioned windings each having one-fourth as many turns as there are between adjacent taps on said first-mentioned additional winding, the voltages of said remaining two additional windings being additive in the series circuit containing them and said reactor and being subtractive with respect to the voltage between said taps.

3. In combination, a transformer provided with a winding having a plurality of spaced taps between any electrically adjacent pair of which there is the same potential difference, a mid-tapped reactor, switching means for selectively connecting the ends of said reactor to the same or different ones of said taps, and means for inserting between the mid-tap of said reactor and said switching means separate potentials equal respectively to one-quarter of the potential between said taps, the relative polarities of said separate potentials being such that the potential of said reactor is one-half the potential between said taps regardless of whether said switching means connects the ends of said reactor to the same or to adjacent taps.

4. In combination, a transformer provided with a winding having a plurality of spaced taps between any electrically adjacent pair of which there is the same potential difference, a mid-tapped reactor, switching means for selectively connecting the ends of said reactor to the same or different ones of said taps whereby said potential difference between taps is selectively inserted in and removed from a circuit containing said reactor and switching means in series, and means for inserting in said circuit symmetrically with respect to the mid-tap of said reactor a total voltage equal to one-half said potential difference between taps and opposite in phase thereto whereby the potential of said reactor is one-half the potential between said taps regardless of whether said switching means connects the ends of said reactor to the same or to adjacent taps.

RALPH B. CARSON.